(12) United States Patent
Itoh et al.

(10) Patent No.: US 8,000,758 B2
(45) Date of Patent: Aug. 16, 2011

(54) PORTABLE TERMINAL DEVICE

(75) Inventors: Toshiyuki Itoh, Kanagawa (JP); Shigeru Yamaguchi, Kanagawa (JP); Hiroshi Kobayashi, Kanagawa (JP); Yoshiaki Kato, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1086 days.

(21) Appl. No.: 11/790,308

(22) Filed: Apr. 25, 2007

(65) Prior Publication Data

US 2008/0074397 A1 Mar. 27, 2008

(30) Foreign Application Priority Data

Sep. 22, 2006 (JP) ................................. 2006-256859

(51) Int. Cl.
*H04M 1/00* (2006.01)
*H04B 1/38* (2006.01)

(52) U.S. Cl. .................. 455/575.3; 455/550.1; 455/566; 455/575.1

(58) Field of Classification Search .................. 345/156, 345/168, 169; 455/550.1, 575.1, 575.3, 566
See application file for complete search history.

(56) References Cited

U.S. PATENT DOCUMENTS

| 7,587,226 B2* | 9/2009 | Makino ....................... 455/575.3 |
| 7,664,256 B2* | 2/2010 | Takei ......................... 379/433.07 |
| 2005/0091431 A1* | 4/2005 | Olodort et al. .................. 710/72 |
| 2005/0107142 A1 | 5/2005 | Soejima |
| 2006/0199606 A1* | 9/2006 | Makino ....................... 455/550.1 |
| 2007/0026909 A1* | 2/2007 | Jung et al. .................. 455/575.3 |
| 2008/0045279 A1* | 2/2008 | Ohki ......................... 455/575.1 |

FOREIGN PATENT DOCUMENTS

| JP | 2002-94627 A | 3/2002 |
| JP | 2002-132418 A | 5/2002 |
| JP | 2003-46617 A | 2/2003 |
| JP | 2003-163727 A | 6/2003 |
| JP | 2003-304311 A | 10/2003 |
| JP | 2005-151166 A | 6/2005 |
| JP | 2007-228042 A | 9/2007 |

OTHER PUBLICATIONS

Japanese Notice of Reason for Rejection, English-language translation, mailed Oct. 19, 2010 for corresponding Japanese Application No. 2006-256859.

* cited by examiner

*Primary Examiner* — My-Chau T Tran
(74) *Attorney, Agent, or Firm* — Fujitsu Patent Center

(57) ABSTRACT

A portable terminal device having a folding structure includes a body unit 20 having operation keys 21, a display unit 10 movably connected to the body unit 20 and having a display 11 on an opposite surface to the operation keys 21 when folded, and a protruded portion 12, for preventing damage to the display, provided along an outer edge portion of the display 11 on the opposite surface of the display unit 10 and formed so that its height on the connecting side to the body unit 20 is smaller than on the side of a free end of the display unit 10.

7 Claims, 6 Drawing Sheets

PORTABLE TERMINAL DEVICE

BACKGROUND OF THE INVENTION

The present invention relates generally to a portable terminal device, and more particularly to a portable terminal device in which a display unit having a display is movably connected to a body unit having operation keys.

Some of portable terminal devices in recent years are provided with a display representation function composed of a liquid crystal and an organic EL (Electroluminescence). Further, a large number of portable terminal devices having a folding structure are spread. However, the conventional portable terminal device having the typical folding structure has such a problem that the display takes a vertically-elongated fixed configuration and is therefore poor of usability.

A variety of technologies are proposed in order to solve the problem. For example, Patent document 1 discloses a technology in which the display (display unit) is connected rotatably and/or movably to an operation board (body unit).

[Patent document 1] JP 2005-151166 A

SUMMARY OF THE INVENTION

The portable terminal device having the general type of folding structure takes such a structure that the display faces the operation keys when folded. A direct contact of the display with the operation keys might, however, cause damage to the display. A known technology for avoiding this damage is that part of the body unit is provided with a protruded portion so as not to bring the display into contact with the operation keys etc on the opposite surface of the body unit when folded. Further, another practical method is that damage preventive component (a protector etc) is attached to the display.

In the case of attaching the separate component like the protector, however, such problems arise that a design characteristic declines, the number of components increases, and the portable terminal device expands in size. This is not preferable to the present marketplace in which downsizing, further cost-down and an excellent design characteristic are demanded of the portable terminal devices.

Moreover, there have increasingly appeared year by year the portable terminal devices each having the folding structure in which the display unit is rotatably and/or movably connected to the body unit in order to have flexibility with diversified contents. In the case of rotating the display unit in the folded state of the portable terminal device, however, such a situation occurs that the display causes friction with the opposite surface of the body unit. Accordingly, the conventional structure for simply preventing the contact as by partially providing the protruded portion is unable to sufficiently fulfill the purpose of preventing the damage to the display.

It is an object of the present invention, in view of the problems described above, to provide a technology related to a portable terminal device contrived to be hard to cause damage to a display in the portable terminal device in which a display unit is relatively movable with respect to a body unit.

The present invention adopts the following means in order to solve the problems. Namely, the present invention is a portable terminal device having a folding structure, comprising a body unit having operation keys, a display unit movably connected to the body unit and having a display on an opposite surface to the operation keys when folded, and a protruded portion provided along an outer edge portion of the display on the opposite surface of the display unit and formed so that its height on the connecting side to the body unit is smaller than on the side of a free end of the display unit.

The portable terminal device according to the present invention is characterized by including the display damage preventive protruded portion provided along the outer edge of the display. This contrivance prevents the display from being damaged. The protruded portion being provided along the outer edge of the display, it should be noted, connotes that the protruded portion is provided on the opposite surface of the display unit to such an extent as to cause a direct contact of the display with the opposite surface of the body unit even when the display unit is rotated in a folded state of the display unit. Herein, in the portable terminal device according to the present invention, the display unit is movably connected to the body unit. Then, this movable state embraces a rotating motion, a sliding motion, etc of the display unit in the folded state in addition to the motion of the display unit in the folding direction. Particularly, in the case of rotating the display unit in the folded state, such a situation occurs that the display unit and the operations keys are brought into friction with each other. The portable terminal device according to the present invention can prevent the display from being damaged even in such a situation.

Further, the portable terminal device according to the present invention is characterized in that a height of the protruded portion provided along the outer edge of the display is not uniform. More specifically, the portable terminal device is characterized in that the height of the protruded portion on a connecting side with the body unit is set smaller than on the side of a free end of the display unit. If the height of the protruded portion provided along the outer edge of the display is set uniform, the protruded portion interferes with the body unit on the connecting side between the display unit and the body unit, with the result that the portable terminal device becomes a so-called mouth-open state. In the portable terminal device according to the present invention, however, the height of the protruded portion on the connecting side is set smaller than on the side of the free end. It is therefore possible to prevent the portable terminal device from becoming the mouth-open state. It is to be noted that a height variation, described above, of the protruded portion may be set smaller gradually toward the connecting side from the side of the free end. Moreover, the height variation of the protruded portion may also be set smaller stepwise toward the connecting side from the side of the free end.

It should be noted that the configuration of the protruded portion is not particularly limited. For example, the protruded portion may be rectangular and also semicircular in sectional configuration, and may take such a configuration that corners of the rectangle are chamfered.

Further, in the portable terminal device according to the present invention, it is preferable that the protruded portion be provided integrally with the display. It is because this configuration leads to a decrease in the number of components. Note that the integral formation of the protruded portion and the display can be attained by injection molding. Moreover, a material of the protruded portion is not especially limited and can be set the same as of the display. It is, however, said to be preferable that the material of the protruded portion is slightly softer than a material forming the opposite surface of the body unit. This contrivance enables absorption of an impact when causing the friction with the opposite surface of the body unit.

Moreover, the portable terminal device according to the present invention may further comprise a connection unit movably connecting the body unit to the display unit, wherein the connection unit may include a first hinge rotatably connecting the display unit in a folding direction, and a second hinge rotatably connecting the display unit on the plane parallel with the display.

The connection unit movably connects the body unit to the display unit. The connection unit is provided with the first hinge and the second hinge. The first hinge enables the display unit to rotate in the folding direction. Further, the second hinge enables the display unit to rotate on the plane parallel with the display. It should be noted that the rotation on the plane parallel with the display can be made in both of the folded state and an open state of the portable terminal device.

Moreover, according to the present invention, the protruded portion may be provided along a periphery of the outer edge of the display. The periphery of the outer edge connotes that the protruded portion is formed on the opposite surface of the display unit seamlessly so as to circumscribe the periphery of the display. With this contrivance, even when rotating the display unit in the folded state of the portable terminal device, it follows that the protruded portion always abuts on the opposite surface of the body unit. As a result, it is possible to prevent the display from being damaged due to the friction with the body unit.

Yet further, according to the present invention, the protruded portions may be provided in a dotted-line-like shape along the periphery of the outer edge of the display, each of the protruded portions taking the dotted-line-like shape may be formed larger in length than an outside diameter of the operation key, and an interval between the protruded portions taking the dotted-line-like shape may be set smaller than an interval between the operation keys.

The dotted-line-like shape connotes that the plurality of protruded portions are formed to such an extent that the opposite surface of the body unit does not directly abut on the display. Then, each of the protruded portions is set larger than the outside diameter of the operation key, and the interval between the protruded portions is set smaller than the interval between the operation keys. With this contrivance, it is feasible to prevent the direct contact between the opposite surface of the body unit and the display without seamlessly forming the protruded portion. As a result, the display can be prevented from being damaged due to the friction with the body unit.

Moreover, according to the present invention, it is preferable that the operation key be formed so as not to protrude from the opposite surface of the body unit. If the operation key protrudes from the opposite surface of the body unit, when rotating the display unit in the folded state of the portable terminal device, it is assumed that the operation key might be caught by the protruded portion. This situation can be, however, avoided by forming the operation key so as not to protrude from the opposite surface of the body unit.

Yet further, according to the present invention, a display unit displaying content information can be set to only the display that faces the operation keys when folded. In recent years, the portable terminal devices, not a few, are each provided with a sub-display outwardly of the display unit to make the content information recognizable even in the folded state. Herein, in the portable terminal device according to the present invention, the display unit can be rotated in the folded state on the plane parallel with the display. Then, owing to this rotating function, according to the portable terminal device of the present invention, part of the display can be visually recognized by rotating the display unit through a predetermined angle while being kept in the folded state. Namely, the display itself can be provided with the function of the conventional sub-display, and hence there is no necessity of providing another sub-display. Accordingly, it can be said that the protruded portion according to the present invention is suited also to the portable terminal device in which the display itself is provided with the function of the sub-display.

According to the present invention, it is possible to provide the technology related to the portable terminal device contrived to be hard to cause the damage to the display in the portable terminal device in which the display unit is relatively movable with respect to the body unit.

DETAILED DESCRIPTION OF THE INVENTION

Next, embodiments of a portable terminal device according to the present invention will hereinafter be described with reference to the drawings.

Embodiment 1

Figure 1:
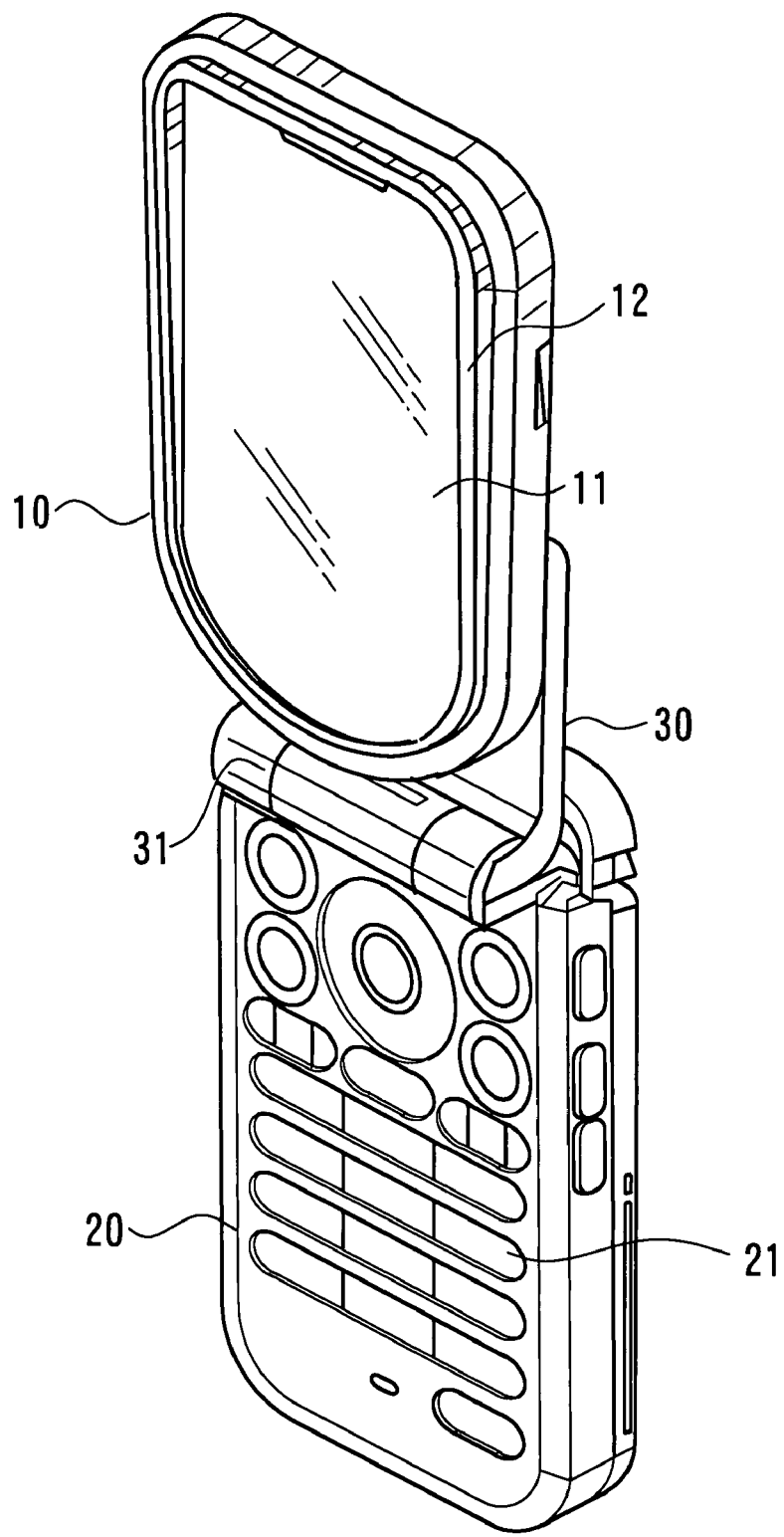
FIG. 1 is a perspective view showing a state where a portable terminal device opens.
Figure 2A:
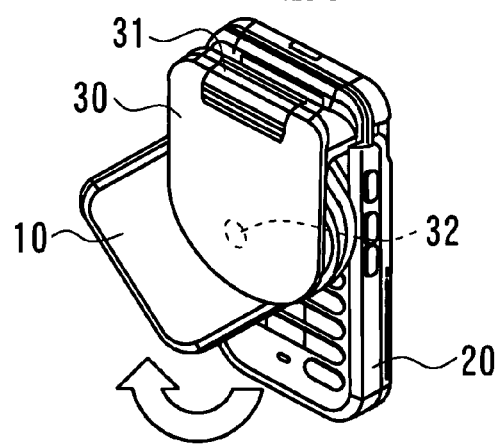
FIG. 2A is a perspective view showing how a display unit is rotated clockwise in a folded state of the portable terminal device.
Figure 2B:
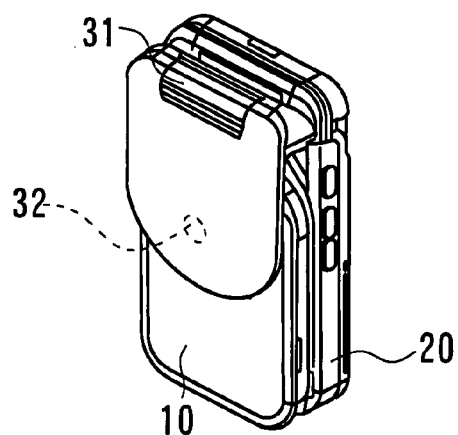
FIG. 2B is a perspective view showing the folded state of the portable terminal device.
Figure 2C:
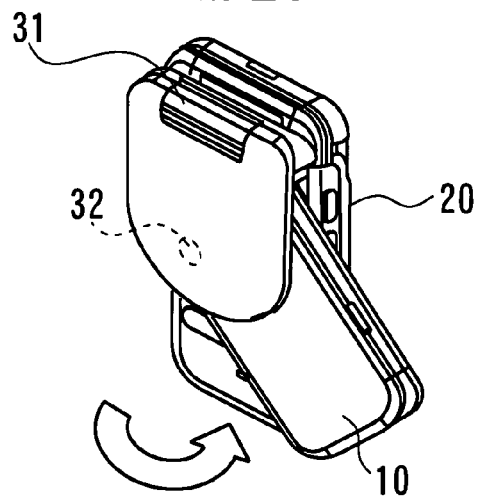
FIG. 2C is a perspective view showing how the display unit is rotated counterclockwise in the folded state of the portable terminal device.

FIG. 1 is a perspective view showing a state where the portable terminal device according to a first embodiment opens. Further, FIGS. 2A through 2C are perspective view showing movable states of a display unit 10. FIG. 2A is the perspective view showing how the display unit 10 is rotated clockwise in a folded state of the portable terminal device. FIG. 2B is the perspective view illustrating the folded state of the portable terminal device. FIG. 2C is the perspective view showing how the display unit 10 is rotated counterclockwise in the folded state of the portable terminal device.

As illustrated in FIGS. 1 and 2A through 2C, the portable terminal device according to the first embodiment includes the display unit 10 having a display 11 and a body unit 20 having operation keys 21, wherein the display unit 10 and the body unit 20 are electrically connected to each other in a movable manner by a connection unit 30. Further, a protruded portion 12 for preventing damage to the display 11, which is caused by friction with the body unit 20, is formed on an opposite surface of the display unit 10 and along a periphery of an outer edge of the display 11.

Moreover, the connection unit 30 includes a first hinge 31 and a second hinge 32. This configuration enables the portable terminal device according to the first embodiment to perform a general type of folding motion and, in addition, to rotate also on the plane parallel with the display 11. The respective configurations will be explained in greater detail.

The body unit 20 takes a vertically-elongated rectangular shape as viewed on the plane. Then, a variety of operation keys 21 for operating the portable terminal device are provided on the opposite surface of the body unit 20. It should be noted that these operation keys 21 are so formed as not to protrude from the opposite surface of the body unit 20 in the portable terminal device according to the first embodiment. With this configuration, even when the display unit 10 is rotated on the plane parallel with the display 11 in the folded state of the portable terminal device, it does not happen that the operation keys 21 are caught by the protruded portion 12.

The connection unit 30 takes a vertically-elongated rectangular shape as viewed on the plane. Then, a width of the connection unit 30 is substantially the same as a width of the body unit 20, however, the connection unit 30 is formed shorter in its length than the body unit 20. Then, a free end, situated on the side opposite to an edge portion provided with the first hinge 31, of the connection unit 30 is formed in a shape of circular arc. This contrivance enables a user to associate the circular arc with such an image that the display unit 10 may rotate about the center of this circular arc. Further, this configuration can improve a design characteristic of the portable terminal device.

The connection unit 30 includes the first hinge 31 that connects the connection unit 30 to the body unit 20, and the second hinge 32 that connects the connection unit 30 to the display unit 10. The first hinge 31 connects an upper edge portion of the connection unit 30 to an upper edge portion of the body unit 20. The first hinge 31 is provided so that a rotating shaft of the first hinge 31 is parallel with an inside upper edge portion of the body unit 20. This configuration enables the display unit 10 to rotate in the folding direction. Note that a rotatable angle of the first hinge 31 is not particularly limited. For example, the inside surface of the body unit 20 and the display 11 are situated substantially on the same plane by setting the rotatable angle to 180 degrees. As a result, when the user holds the body unit 20 in hand, content information can be displayed at an easy-to-see angle on the display 11.

The second hinge 32 connects the connection unit 30 to the display unit 10. The second hinge 32 is provided so that its rotating shaft exists on the central line in a widthwise direction of the portable terminal device and is substantially orthogonal to the surface of the display 11 slightly upwards in a longitudinal direction thereof. This configuration enables the display 11 to be freely turned about the rotating shaft of the second hinge 32 from a vertical state to a lateral state. It should be noted that the portable terminal device according to the first embodiment is capable of rotating the display unit 10 even in the folded state on the plane parallel with the display 11. For instance, when the display unit 10 is rotated through approximately 90 degrees in the folded state of the portable terminal device, part of the upper area of the display 11 can be visually recognized while being kept in the folded state. Therefore, according to the portable terminal device in the first embodiment, the partial area of the display 11 can be made to function as a sub-display without even providing another sub-display outwardly of the display unit 10.

The display unit 10 takes substantially a vertically-elongated rectangular shape as viewed on the plane. However, the edge portion, on the side of the first hinge 31, of the display unit 10, is formed in a shape of circular arc. As a result, when the display unit 10 is rotated on the plane parallel with the display 11, the edge portion of the display unit 10 can be prevented from interfering with the first hinge 31. Note that the display unit 10 is substantially the same in both of its width and length as the body unit 20 but is formed so that its length is shorter by a dimension of the first hinge 31 than the body unit 20. Then, the display unit 10 is connected via the second hinge 32 to the opposite surface of the connection unit 30.

Figure 3A:
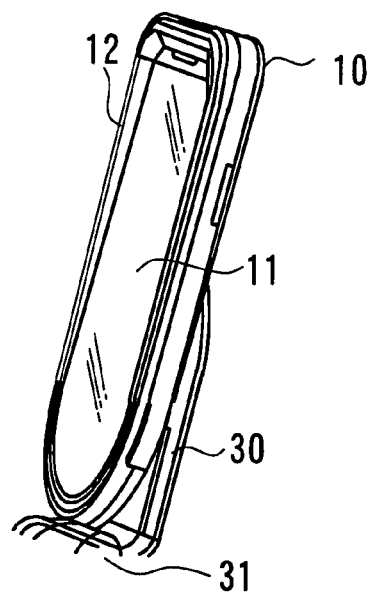
FIG. 3A is an enlarged perspective view of the portable terminal device including a protruded portion of which a height changes little by little.
Figure 3B:
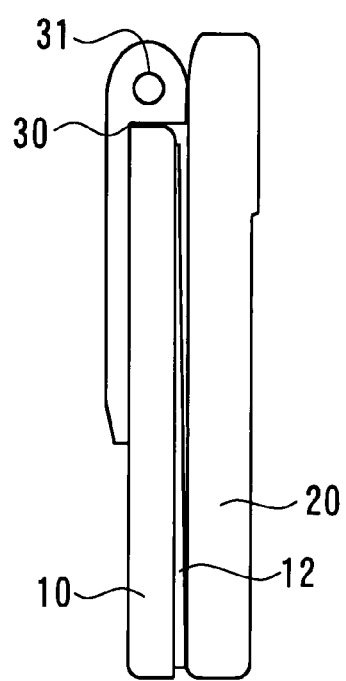
FIG. 3B is a side view of the portable terminal device including the protruded portion of which the height changes little by little.
Figure 4:
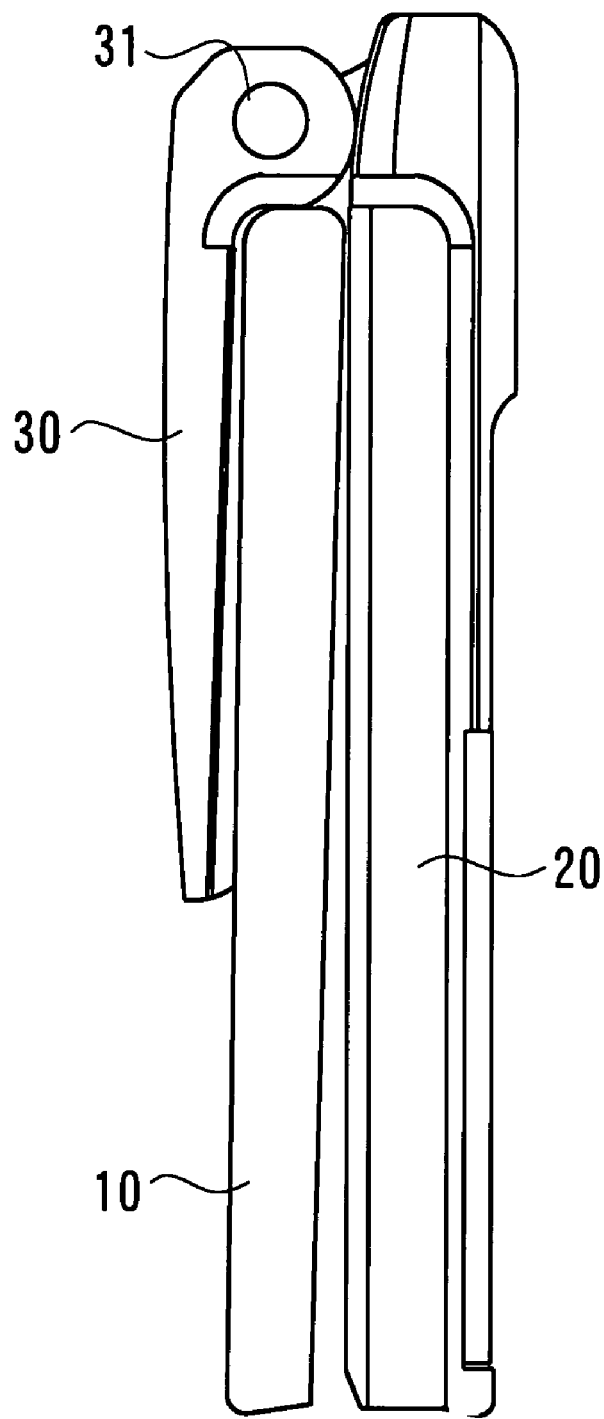
FIG. 4 is a side view showing the portable terminal device in a mouth-open state.

The display 11 is provided on the opposite surface of the display unit 10. Then, the protruded portion 12 is seamlessly formed integrally with the display 11 along the periphery of the outer edge of the display 11. Herein, more of the in-depth description of the protruded portion 12 will be given. FIG. 3A is an enlarged perspective view of the portable terminal device having the protruded portion 12 of which a height gradually changes. FIG. 3B is a side view of the portable terminal device having the protruded portion 12 that gradually changes in its height. As illustrated in FIGS. 3A and 3B, the protruded portion 12 according to the first embodiment is formed so that the height thereof on the side of the first hinge 31 is lower than on the side of the free end. It is possible, by taking this configuration, to prevent a so-called mouth-open state caused when the protruded portion 12 interferes with the first hinge 31. FIG. 4 is a side view showing the portable terminal device in the mouth-open state. The mouth-open state connotes that the edge portion, on the side of the first hinge 31, of the display unit 10 interferes with the body unit 20, with the result that the display unit 10 on the side of the free end does not completely close. In the portable terminal device according to the first embodiment, the protruded portion 12 is formed so that the height thereof on the side of the first hinge 31 is lower than on the side of the free end, and a clearance is ensured between the opposite surface of the display unit 10 on the side of the first hinge 31 and the opposite surface of the body unit 20. As a result, according to the portable terminal device in the first embodiment, the so-called mouth-open state can be avoided.

Figure 5A:
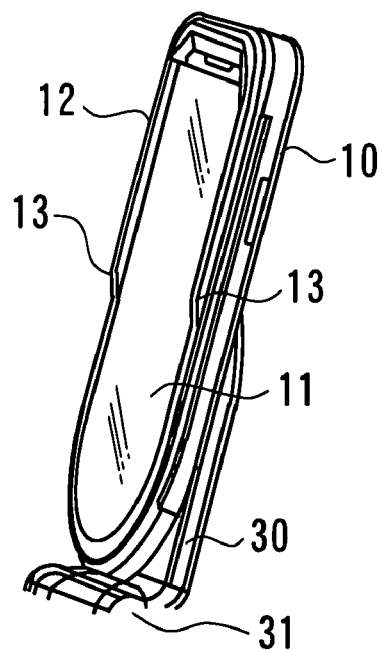
FIG. 5A is an enlarged perspective view of the portable terminal device including the protruded portion provided with stepped portions.
Figure 5B:
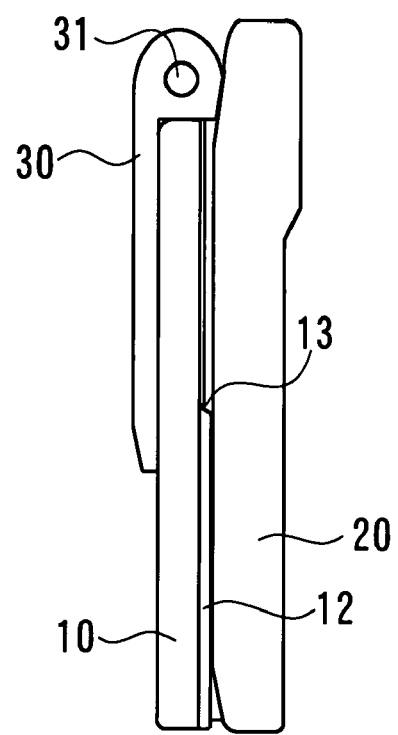
FIG. 5B is a side view of the portable terminal device including the protruded portion provided with the stepped portions.

It is to be noted that the first embodiment takes the configuration that the height of the protruded portion 12 gradually changes. The configuration of the protruded portion 12 is not, however, limited to this configuration. For instance, the height of the protruded portion 12 can be changed on the side of the first hinge 31 and on the side of the free end by providing stepped portions. FIG. 5A is an enlarged perspective view of the portable terminal device having the protruded portion 12 provided with stepped portions 13. FIG. 5B is a side view of the portable terminal device having the protruded portion 12 provided with stepped portions 13. As shown in FIGS. 5A and 5B, the height of the protruded portion 12 according to the first embodiment is larger on the side of the free end but smaller on the side of the first hinge 31 at a boundary of the stepped portions 13. Then, even in this state, the so-called mouth-open state can be avoided.

Figure 6A:
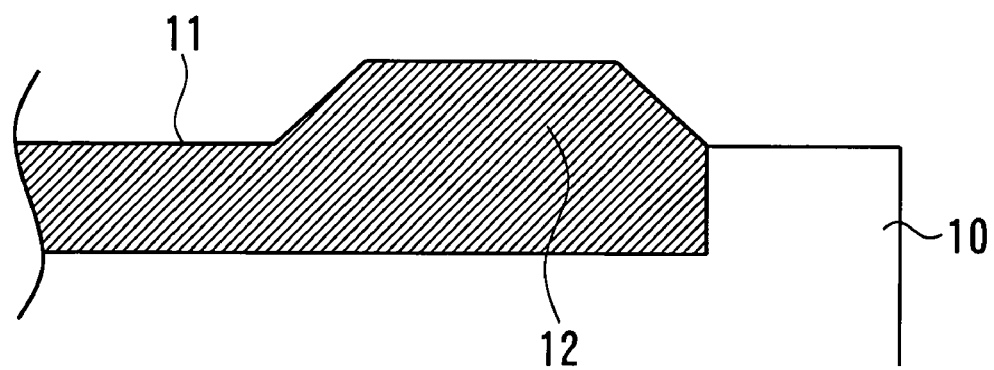
FIG. 6A is a-sectional view of the protruded portion that is substantially rectangular in section and takes such a configuration that corners thereof are chamfered.
Figure 6B:
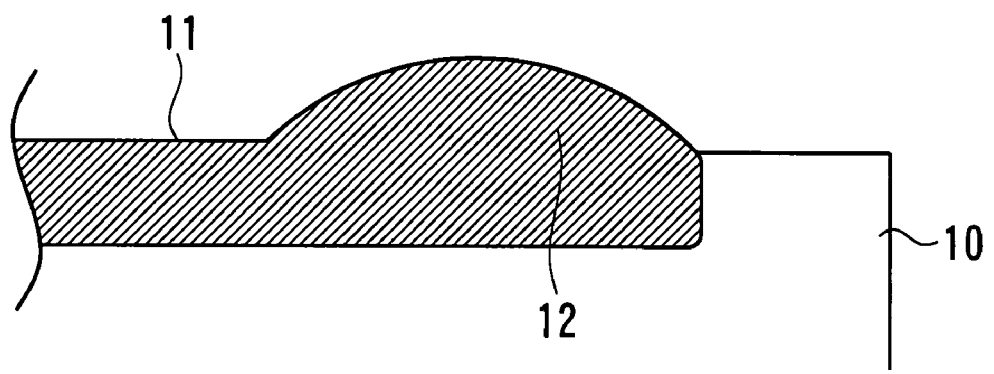
FIG. 6B is a sectional view of the protruded portion taking a semicylindrical shape in section.
Figure 6C:
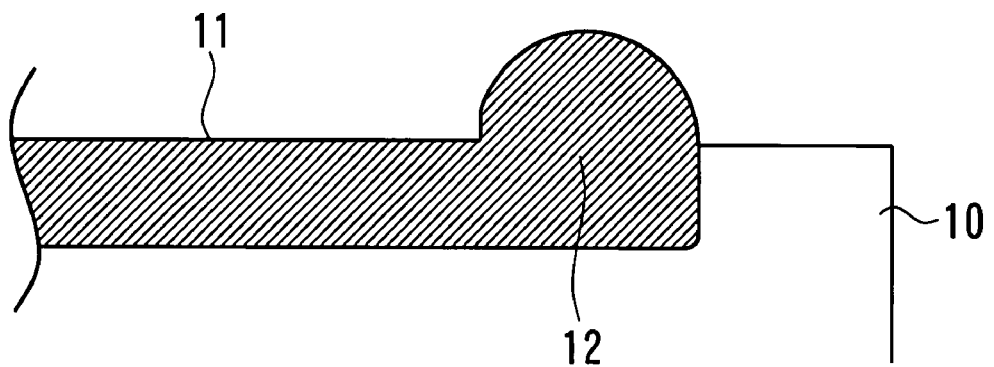
FIG. 6C is a sectional view of the protruded portion that is semicircular in section.

Next, a sectional configuration of the protruded portion 12 will be explained. FIGS. 6A, 6B and 6C are views each illustrating the sectional configuration of the protruded portion 12. The sectional configuration of the protruded portion 12 can be, though not particularly limited, formed as in, e.g., FIGS. 6A through 6C. The protruded portion 12 depicted in FIG. 6A is substantially rectangular in section and is chamfered at corners thereof. The protruded portion 12 illustrated in FIG. 6B is formed in a semicylindrical shape in section.

Further, the protruded portion 12 depicted in FIG. 6C is formed in a semicircular shape in section. Then, these protruded portions 12 can be formed by injection molding integrally with the display 11.

According to the portable terminal device in the first embodiment discussed so far, the damage to the surface of the display 11 can be prevented by providing the protruded portion 12. Namely, in the portable terminal device according to the first embodiment, the protruded portion 12 is provided seamlessly along the periphery of the outer edge of the display 11. Accordingly, even in the case of rotating the display unit 10 on the plane parallel with the display 11 in the folded state of the portable terminal device, it follows that the protruded portion 12 always gets abutted on the opposite surface of the body unit 20. As a result, the direct contact of the display 11 with the opposite surface of the body unit 20 is prevented, and hence the display 11 can be prevented from being damaged due to the friction with the body unit 20. Moreover, the portable terminal device according to the first embodiment takes the height-slanted (height-ununiformed) configuration that the protruded portion 12 gets lower in its height than on the side of the first hinge 31. As a consequence, the portable terminal device can be prevented from becoming the so-called mouth-open state.

The preferred embodiment of the present invention has been discussed so far, however, the portable terminal device according to the present invention is not limited to this embodiment and can embrace a combination of embodiments to the greatest possible degree. It is to be noted that in the portable terminal device according to the first embodiment, the protruded portion 12 is disposed seamlessly along the periphery of the outer edge of the display 11. This contrivance enables the protruded portion 12 to always abut on the opposite surface of the body unit 20, thereby preventing the surface of the display 11 from being damaged. The protruded portions 12 may, however, be disposed, e.g., in a dotted-line-like shape. In the case of disposing the protruded portions 12 in the dotted-line-like shape, however, it is preferable that a length of each of the protruded portions 12 be set larger than an outside diameter of the operation key 21 and an interval between the protruded portions 12 be set smaller than an interval between the operation keys 21. If configured in this way, it is because the direct contact of the opposite surface of the body unit 20 can be prevented without forming the protruded portion 12 seamlessly.

Further, the embodiment described above has exemplified the portable terminal device in which the display unit 10 is rotatable on the plane parallel with the display 11, however, the portable terminal device is not limited to this configuration. For instance, the portable terminal device may be configured so that the display unit 10 is slidable on the body unit 20. Moreover, the embodiment described above has shown that the protruded portion 12 is provided along the outer edge portion of the display 11. The protruded portion 12 is not, however, necessarily limited to this configuration. In the portable terminal device including the sub-display, if the sub-display is brought into contact with, e.g., the body unit 20, the protruded portion 12 may be provided along the outer edge portion of the sub-display.

<Others>

The disclosures of Japanese patent application No. JP2006-256859 filed on Sep. 22, 2006 including the specification, drawings and abstract are incorporated herein by reference.

What is claimed is:

1. A portable terminal device having a folding structure, comprising:
    a body unit having operation keys;
    a display unit movably connected to said body unit and having a display on an opposite surface to said operation keys when folded; and
    a protruded portion provided along an outer edge portion of said display and formed so that its height on the connecting side to said body unit is smaller than on the side of a free end of said display unit.

2. A portable terminal device according to claim 1, wherein said protruded portion is provided integrally with said display.

3. A portable terminal device according to claim 1, further comprising a connection unit movably connecting said body unit to said display unit,
    wherein said connection unit includes:
    a first hinge rotatably connecting said display unit in a folding direction; and
    a second hinge rotatably connecting said display unit on the plane parallel with said display.

4. A portable terminal device according to claim 1, wherein said protruded portion is provided along the periphery of the outer edge of said display.

5. A portable terminal device according to claim 1, wherein said protruded portions are provided in a dotted-line-like shape along the periphery of the outer edge of said display,
    each of said protruded portions taking the dotted-line-like shape is formed larger in length than an outside diameter of said operation key, and
    an interval between said protruded portions taking the dotted-line-like shape is set smaller than an interval between said operation keys.

6. A portable terminal device according to claim 1, wherein said operation keys are formed so as not to protrude from the opposite surface of said body unit.

7. A portable terminal device according to claim 1, wherein a display unit displaying content information is only said display that faces said operation keys when folded.

* * * * *